Patented June 12, 1934

1,962,498

UNITED STATES PATENT OFFICE 1,962,498

PROCESS OF RECOVERING ALUMINUM AS ALUMINUM SULPHATE

John G. G. Frost, Cleveland, Ohio, assignor to The National Smelting Company, Cleveland, Ohio, a corporation of Ohio No Drawing. Application January 15, 1930, Serial No. 421,055

10 Claims. (Cl. 23—123)

This invention relates to a process of recovering aluminum in the form of aluminum sulphate from foundry or smelter "dust" and the like, such dust ordinarily having an aluminum content not otherwise readily recoverable.

The term "dust" as used herein refers to the material known in the art as such and which comprises finely divided aluminum dross intermixed with foreign materials, such as sand and miscellaneous metallic and non-metallic impurities. Such dust ordinarily contains aluminum in the metallic form, in the form of oxides, and in the form of other compounds such as carbides, nitrides, etc. As common metallic impurities may be mentioned copper, iron and zinc.

An object of this invention is to provide a method for the direct recovery of the constituents of foundry or smelter dust and the like. Another object is to provide a method of recovering substantially the entire aluminum content of such foundry dust, whether in the form of metallic aluminum, alumina, or otherwise. Another object is to provide a method for recovering aluminum in the form of aluminum sulphate, which is relatively simple in procedure and effective in its results.

Other objects will be apparent to those skilled in the art from the disclosures herein made.

By my improved process the dust from which the aluminum is to be recovered is washed thoroughly to clean the same and to remove all soluble material including flux contained in the dust from previous foundry or smelting operations or otherwise. The dust so cleaned is then subjected to the action of a magnetic separator to remove as completely as possible the magnetic iron content of the dust.

The magnetic separator may be either of the dry or of the wet type. In the former case, the magnetic separation will be performed before washing the dust rather than after.

The dust thus cleaned and freed from its magnetic iron content is filtered, and a filter cake obtained therefrom. Sufficient heat is ordinarily developed within the filter cake, as a result of the exothermic reactions therein occurring from the oxidation of the finely divided metallic aluminum, to dry the filter cake. It may be noted that finely divided aluminum oxidizes rapidly in the presence of moisture and of certain metals, such as iron, copper, and zinc, the latter acting apparently in the manner of a catalyst.

The material of the filter cake, which may be dry or partially dry, is next mixed with concentrated sulphuric acid, for example, of a density of 66 degrees Baumé, in a suitable mixer for a period of about three to five minutes. By the resulting reaction considerable heat is developed, the product of the reaction being a sponge having the characteristics of a dry powder and containing aluminum in the form of aluminum sulphate. The heat produced in the reaction also destroys organic matter which otherwise would color the aluminum sulphate solution subsequently to be formed. The heat furthermore prevents the formation of non-settling slimes.

The percentage of the aluminum content of the dust transformed into aluminum sulphate by this reaction may be greatly increased by permitting the sponge to stand in a pile for a substantial period of time such as several days or a week or two.

The sponge containing the products of reaction is disposed in a suitable tank and treated with water and then with steam, so as to boil the material for about four to five hours. The product of this boiling is an aluminum sulphate solution of about 36 degrees Baumé containing also dissolved ammonium alum derived from the nitrogen content of the dust together with the solid residue from the dust.

Where the sulphating is made more complete, as by permitting the spronge to stand, then the residue consists mostly of silica together with some metallic copper. If desired, such copper content may be recovered.

Where the sulphating reaction is not carried to completion, as by not permitting the sponge to stand, then a considerable portion of the aluminum content of the dust is present in the residue in the form of alumina which is sufficiently iron-free to permit the electrolytic recovery of aluminum therefrom employing, for example, a cryolite bath.

The extent to which the sulphating reaction is carried will, therefore, depend upon the end products desired. Thus, if aluminum sulphate is desired, the sulphating reaction will be carried on as completely as possible, whereas if electrolytic aluminum is desired the sulphating reaction will be carried on less completely.

The hot concentrated aluminum sulphate liquor is separated from the residue by filtration and the filtrate allowed to cool, whereupon most of the ammonia present crystallizes out in the form of ammonium alum which may be separated from the mother liquor in any suitable way such as by decantation or filtration. Should the ammonium sulphate liquor not be sufficiently concentrated for the selective crystallization of the ammonium alum, further concentration of the liquor may be effected for this purpose.

The remaining mother liquor is separated from the selectively crystallized ammonium alum by decantation, filtration or other suitable means and the said mother liquor then further concentrated preferably to a point at which the aluminum sulphate material contains less than 18 H₂O, referring to molecules of water of crystallization, whereby, upon cooling, a lump or cake of aluminum sulphate is formed. It is preferred to obtain the aluminum sulphate in this form because aluminum sulphate crystals are very difficult to dry. The aluminum sulphate may, of course, be obtained in any other suitable manner from the concentrated solution, for example, as by spraying said concentrated solution into the air, and this is especially true when a white powder is desired which is free from discoloration.

When the dust contains an excessive amount of magnetic iron, such iron may be removed from the aluminum sulphate solution subsequent to the selective crystallization of ammonium alum and prior to the aluminum sulphate concentration. Thus, the mother liquor remaining from the selective crystallization of the ammonium alum, which is substantially neutral, may be treated with sufficient tannic acid to precipitate the iron content of the solution. The precipitate may then be separated and the filtrate subsequently concentrated for the recovery of the aluminum sulphate, as set forth above.

By the method above disclosed, I am able to recover in a commercially saleable form substantially the entire aluminum content of foundry or smelter dust and the like, which dust formerly went to waste or was less satisfactorily utilized. It will be observed from the disclosures herein, that the nitrogen content of the "dust" or other raw material such as present, for example, in the form of aluminum or magnesium nitride may be recovered in the form of ammonium alum.

It will further be noted that my process is direct and simple and gives consistent results in actual operation.

Furthermore, it is to be understood that the particular compounds disclosed, and the procedure set forth, are presented for purposes of explanation and illustration and that various equivalents can be used and modifications of said procedure can be made without departing from my invention as defined in the appended claims.

What I claim is:

1. The method of recovering constituents from foundry dust and the like containing aluminum and nitrogen, which comprises treating said dust with only a sufficient amount of concentrated sulphuric acid in order to form aluminum sulphate in the form of a spongy mass, boiling the sponge resulting from said sulphuric acid treatment with water for a time sufficient to dissolve substantially the entire nitrogen content thereof in the form of ammonium alum and selectively crystallizing out ammonium alum, whereby to recover the nitrogen content of the original dust.

2. The method of recovering aluminum from foundry dust and the like, which comprises washing said dust to remove soluble impurities, removing the magnetic iron from said dust, treating said dust with only a sufficient amount of concentrated sulphuric acid to form a spongy mass and agitating said sulphuric acid and dust mixture to cause substantially the entire aluminum content of said dust to react with said sulphuric acid, boiling the resultant sponge formed from said sulphuric acid treatment with water for a period sufficient to dissolve the aluminum sulphate content and to extract at least a major proportion of the nitrogen content in the form of ammonium alum, removing the ammonium alum content of said solution by selective crystallization, and separating out the aluminum sulphate content of the remaining mother liquor.

3. The method of recovering aluminum from foundry dust and the like, which comprises removing water-soluble impurities and magnetic iron from said dust, agitating concentrated sulphuric acid with said dust to accomplish a thorough mixing, boiling the reaction product formed from said sulphuric acid treatment for a period of four to five hours to form an aluminum sulphate solution and to extract the nitrogen in the form of ammonium alum, separating the aluminum sulphate solution from the undissolved residue, selectively crystallizing out ammonium alum from said aluminum sulphate solution, and subsequently recovering the aluminum sulphate from said solution.

4. The method of recovering aluminum from foundry dust and the like, which comprises treating said dust with concentrated sulphuric acid, agitating said sulphuric acid mixture thoroughly to accomplish a complete reaction, boiling the reaction product of said sulphuric acid treatment with water for a time sufficient to dissolve substantially the entire aluminum sulphate content thereof and to extract at least a major proportion of the aluminum sulphate in the form of ammonium alum, selectively crystallizing out ammonium alum, neutralizing the remaining mother liquor and adding tannic acid thereto sufficient in amount to precipitate the iron content thereof, separating the solution from said precipitate, boiling down the aluminum sulphate solution to a thick syrup, and cooling said syrup to obtain aluminum sulphate in solid lump or cake form.

5. The method of recovering aluminum from foundry dust and the like, which comprises washing said dust to remove water soluble constituents therefrom, treating said dust with only sufficient concentrated sulphuric acid to form a spongy mass, boiling the reaction product with water for a sufficient length of time to dissolve the aluminum sulphate and to extract the principal nitrogen content in the form of ammonium alum, removing the ammonium alum by selective crystallization, concentrating the remaining aluminum sulphate mother liquor, and spraying said solution into the air to form aluminum sulphate powder.

6. The method of recovering aluminum sulphate substantially free from discoloration from foundry dust and the like, which comprises sulphating said dust with only a sufficient amount of a sulphating agent to produce aluminum sulphate in the form of a spongy mass, heating the spongy mass thus formed with water for a sufficient length of time to dissolve the aluminum sulphate, forming a concentrated solution of said aluminum sulphate and spraying the concentrated solution into the air to obtain aluminum sulphate in a dry form.

7. The method of recovering constituents from foundry dust and the like containing aluminum and nitrogen, which comprises treating the dust with a sufficient amount of a sulphating agent to form aluminum sulphate in the form of a spongy mass, boiling the spongy mass thus formed with water for a sufficient length of time to dissolve the aluminum sulphate and to extract at least the major proportion of the nitrogen in the form of ammonium alum, and selectively crystallizing out ammonium alum, thereby recovering the nitrogen content of the original dust.

8. The method of recovering constituents from foundry dust and the like containing aluminum and nitrogen, which comprises treating the dust with sufficient sulphuric acid to form aluminum sulphate in the form of a spongy mass, treating the spongy mass thus formed with boiling water and steam for a sufficient time to dissolve the aluminum sulphate and to extract the nitrogen in the form of ammonium alum, and selectively crystallizing out ammonium alum, thereby recovering the nitrogen content of the original dust.

9. In the method of recovering constituents from foundry dust and the like containing aluminum and nitrogen, the steps which comprise treating the dust with sufficient sulphuric acid to form aluminum sulphate in the form of a spongy mass, and then treating the spongy mass thus formed with boiling water for at least several hours to extract the nitrogen in the form of ammonium alum.

10. In the method of recovering constituents from foundry dust and the like containing aluminum and nitrogen, the steps which comprise treating the dust with sufficient sulphuric acid to form aluminum sulphate in the form of a spongy mass, and then treating the spongy mass thus formed with boiling water and steam for at least several hours to dissolve the sulphate and extract the nitrogen in the form of ammonium alum.

JOHN G. G. FROST.